Figure 1:
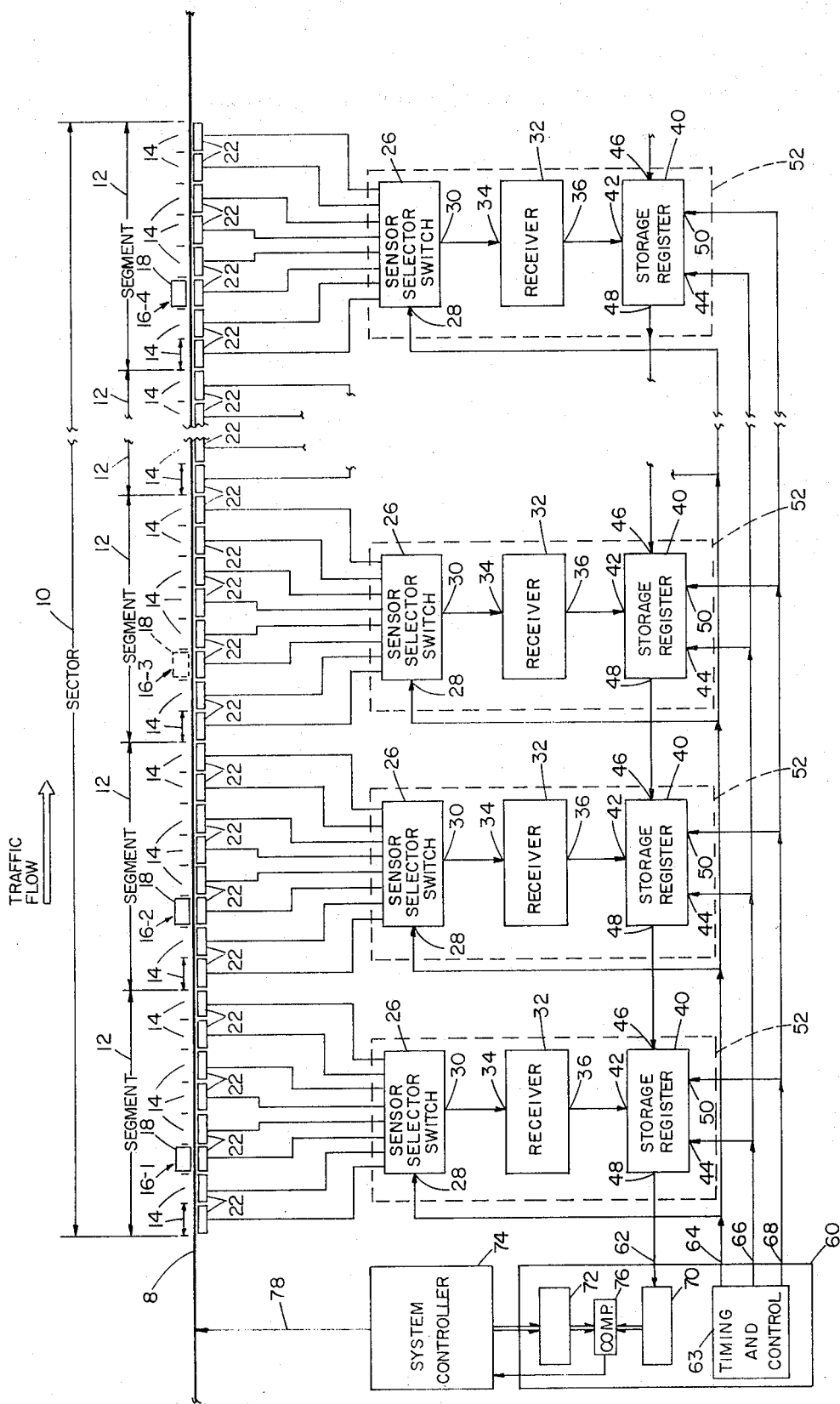

United States Patent [19]
Evans

[11] 3,771,119
[45] Nov. 6, 1973

[54] TRANSIT MONITORING SYSTEM
[75] Inventor: Robert R. Evans, Wyland, Mass.
[73] Assignee: Alden Self-Transit Systems Corporation, Milford, Mass.
[22] Filed: June 22, 1972
[21] Appl. No.: 265,344

[52] U.S. Cl. .............................. 340/23, 246/122 R
[51] Int. Cl. ....................... B61l 25/00, G08g 1/12
[58] Field of Search .................. 246/122 R; 340/23, 340/24, 268

[56] References Cited
UNITED STATES PATENTS
3,263,625 8/1966 Midis et al. ........................... 104/88
3,004,258 10/1961 Cohen et al. ..................... 246/122 R Primary Examiner—James B. Marbert
Assistant Examiner—George H. Libman
Attorney—Willis M. Ertman

[57] ABSTRACT

Vehicles with beacon transmitters are detected by wayside antennas. Code operated switches selectively connect antennas to receivers which indicate vehicle occupancy of associated increments of way. Stored vehicle data is serially shifted to a processor unit.

16 Claims, 2 Drawing Figures

TRANSIT MONITORING SYSTEM

SUMMARY OF THE INVENTION

This invention relates to the control of transit systems and more particularly to monitoring vehicles of such systems.

The present invention may be advantageously applied to a transit system operating with synchronous vehicle control. Such a system may be thought of as having a plurality of vehicle positions or slots which move sequentially along the transit right of way following one another with a definite spacing and interval. Vehicles may be inserted from a terminal into an empty slot, whereupon the vehicle is controlled to move in the slot along the roadway towards some destination. The space between successive slots corresponds to the distance required for safely stopping a vehicle in the event of an emergency. It may be noted that in this type of transit system, some slots will be filled with vehicles and others will be empty, but in any case with normal operation of the system, no vehicle is on the roadway between two adjacent moving slots. It may also be noted that while a filled slot will have a physical vehicle located therein, an empty slot need be marked by no physical object moving on the roadway. In a particular system, the position of an empty slot is defined not by any moving physical object, but exists only on a computer-maintained map of the system.

A primary object of the present invention is to monitor a transit system to obtain information concerning vehicles on the system, and in specific embodiments to ascertain whether vehicles are properly positioned and to initiate appropriate remedial action if any vehicle deviates from its normal position. Further objects include effecting the monitoring with high reliability and modest cost.

One aspect of the invention features a method of monitoring a transportation system in which vehicles normally occupy only definite spaced virtual slots moving in synchronized fashion along a way, including the steps of: dividing a sector of way into segments; dividing each of the segments into a plurality of increments of way, the number of increments in every segment being the same; periodically synchronously sensing all and only increments in the sector then occupied by slots to obtain data indicative of vehicle occupancy in the sensed increment in each segment; maintaining a current record of segments programmed for occupancy by vehicles; comparing the obtained vehicle occupancy data with the current record; and providing an indication of discrepancies between actual and programmed occupancy. In another apsect, apparatus for monitoring vehicles on a transit way comprising a series of sensors disposed along the way, each sensor being adapted to produce a data output in response to occupancy by a vehicle of a distinct increment of the way associated with a corresponding sensor, a plurality of sensor selectors associated one-to-one with the series of sensors, each selector having an indexing input, and operative to enable its associated sensor to produce a data output when and only when a signal of predetermined value indexing the associated sensor is applied to the indexing input and a vehicle is occupying the associated increment of way, a receiver coupled to the series of sensors, the receiver adapted to produce a qualified output signal indicative of stimulation of the then indexed sensor in response to a sensor data output and means for applying an indexing signal to the indexing inputs of the selectors.

A preferred embodiment of the invention features a plurality of local processing apparatus comprising a plurality of local processing units associated one-to-one with successive, contiguous units associated one-to-one with successive, contiguous segments dividing a sector of the way, the segments being each as long as the spacing between the leading edges of successive vehicle supervision slots. Each of the local units included a plurality of sensors responsive to occupancy by a vehicle of a distinct increment of way along the associated segment, the sensors being ordered to correspond with the progress of a vehicle along its associated segment. The preferred embodiment further features storing data as obtained in local registers and sequentially switching the storing data from one register to another and finally to a processing station, and on-board transmitters affixed to vehicles, the radiation of which is sensed by loop antennas installed along the way.

In a specific embodiment, each vehicle carries a transmitter and each increment of way is defined by a fixed sensing antenna that extends the length of the increment. A sector processor in a headway monitoring cycle generates a first signal to select one increment of each segment, a second signal to read vehicle presence data from the selected increment into segment storage and a series of third signals to shift the stored vehicle data to the sector processor for comparison with programmed vehicle data. The headway monitoring cycle may be repeated once per vehicle transition across a segment or more frequently. Other vehicle data may be returned to the sector processor between such vehicle headway monitoring cycles.

Figure 2:
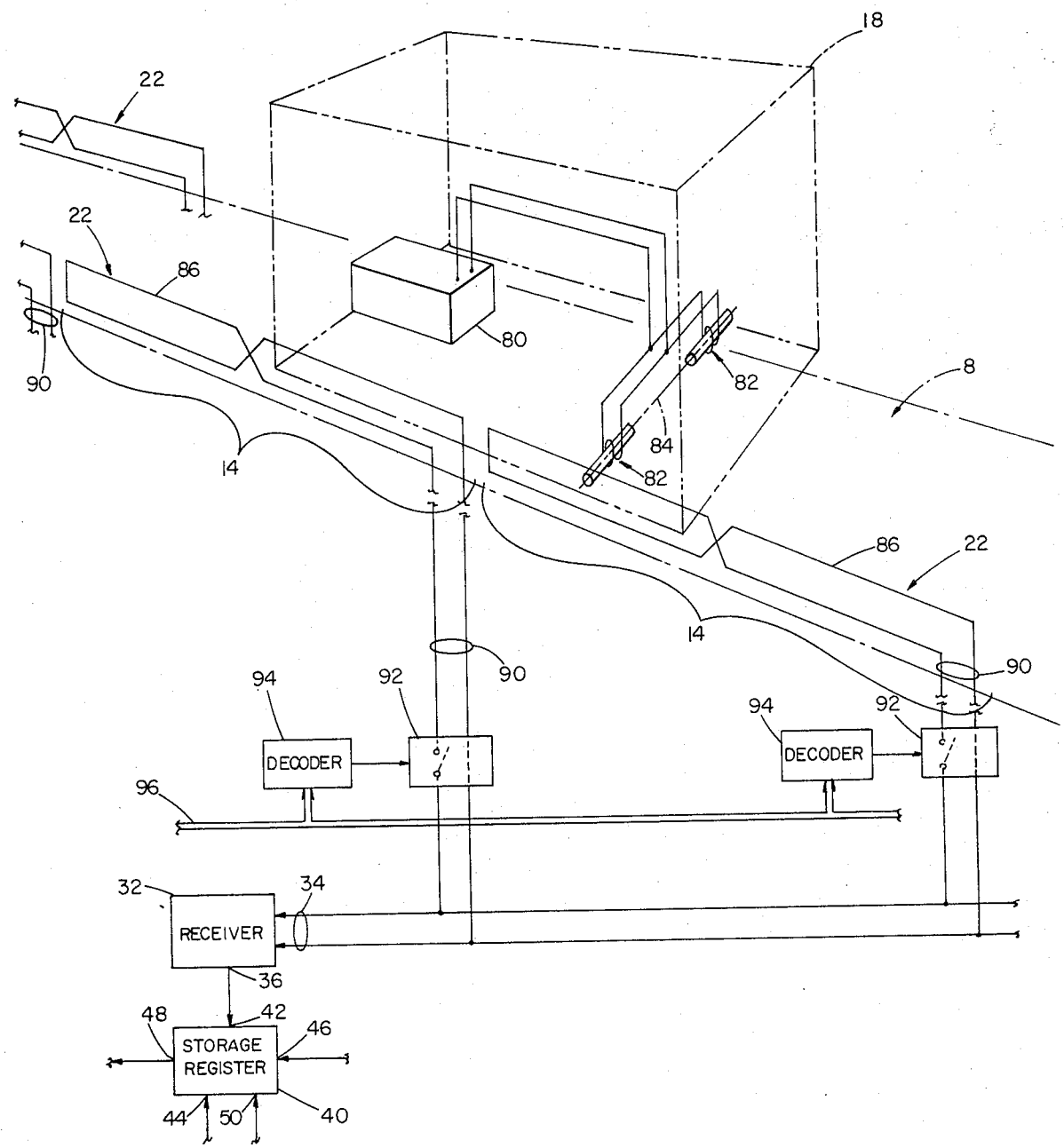

Other objects, features and advantages of the invention will be seen as the following description of a particular embodiment progresses, in conjunction with the drawings, in which:

FIG. 1 shows schematically a sector of a transit way with vehicles disposed thereon and apparatus according to the invention installed to monitor the positions of these vehicles; and FIG. 2 shows, in part diagrammatically, a vehicle operating on the way of FIG. 1 to reveal in more detail beacon transmitters installed on the vehicle and receiving antennas installed along the way with associated electrical apparatus.

DESCRIPTION OF PARTICULAR EMBODIMENT

A sector 10 of a roadway 8 of a synchronous transit system that is monitored in accordance with the invention is shown in FIG. 1. The sector is divided into a plurality of contiguous segments 12, each of which is further divided into eight increments 14. Associated with the roadway are virtual slots 16 which move along the roadway and may or may not be occupied by vehicles. At the instant portrayed in FIG. 1, slots 16 are situated in the third increment of each segment, slots 16–1, 16–2 and 16–4 being occupied by vehicles 18, while slots 16–3 is empty. As an illustrative example, sector 10 might be a mile long and divided into 44 segments 12, each segment being 120 feet in length and in turn divided into eight increments 14, each 15 feet in length.

A sensor 22 extends the length of each increment 14 and a sensor selector is associated with each segment. In the illustrated embodiment, the outputs from each of the increment sensors of a segment are connected through common selector switch 26. Each sensor selector switch 26 is responsive to a specific value of signal applied to its ordinality or indexing input 28 to connect the sensor corresponding to the ordinality signal to the selector output 30. Receiver 32 has input terminal 34 connected to selector output 30 and an output 36. Receiver 32 discriminates the signal applied to its input terminal 34, and depending on whether the signal is above or below a predetermined threshold, transmits one of two values of quantized signal to storage register 40. Register 40, in addition to its data input 42, has a gating input 44, a shift input 46, a shift output 48, and a transfer command input 50. Register 40, upon stimulation of its gating input 44, stores the signal applied to its data input 42 by receiver 32. In response to a shift command on input 50, the stored information is applied to output 48 for transfer to the storage register of the adjacent segment to the left as shown in FIG. 1 and also to receive and store a data signal from the storage register of the adjacent segment to the right.

A group of eight sensors, eight selectors and a receiver-storage register make up a local processing unit 52 for each segment.

Sector processor 60 includes input 62 for receiving data from local units 52, and timing and control unit 63 which generates ordinality output 64 for applying an increment identification signal to selectors 26, gating output 66 for applying gating command signals to inputs 44 of storage registers 40, and shift output 68 for applying shift commands to inputs 50 of the storage registers 40. Sector processor 60 includes a register 70 coupled to input 62 for storing information transmitted from storage registers 40, for example information indicating which segments have a vehicle in the selected increment at a particular instant of time at which an interrogating pulse is transmitted from terminal 66.

Register 72 stores information showing which of the segments is programmed for occupancy by vehicles, this information being continually updated as the vehicles proceed along the way in response to information from system controller 74 which may be of the type shown in Morley et al. U.S. Pat. No. 3,661,092 for example, and compare logic 76 for comparing the data in registers 70 and 72, and initiating remedial action when there is a discrepancy between programmed and actual vehicle position. Controller 74 applies system control signals to the roadway over lines 78.

Additional details of components of the system may be seen with reference to FIG. 2. Each vehicle 18 includes a transmitter 80 that includes a 130 kilohertz oscillator whose output, after amplification, is transformer coupled to a pair of ferrite rod antennas 82. The axes 84 of the ferrite rods 82 is parallel to the surface of way 10 and at right angles to the direction of travel. Each sensor 22 is an elongated receiving antenna 86, approximately 15 feet in length and arranged in the form of a "figure eight." The receiving antennas are mounted on the roadway guide surface in a vertical plane along the direction of travel, and sensor antennas may be located in both guide surfaces adjacent vehicle junctions, for example.

Each pair of pickup antenna output leads 90 are connected to receiver 32 through a reed relay 92 which is controlled by a decoder driver 94. A multiple bit indexing or ordinality signal is applied over lines 96, and a particular three of those bits operate the selector switch 26 of each segment to select a corresponding antenna 86. Upon closing of reed switch 92, a signal is applied through threshold detector 32 to provide an output signal to storage register 40. In a particular embodiment, transmitter 80 is a Model FSC 3100 transmitter manufactured by Marshal Electronics of Pittsburgh, Pa. and threshold detector 32 is a corresponding FSC 3100 receiver.

In normal operation of the transmit system, slots 16 will be distributed along the way with one slot situated in each segment 12. Some of the slots 16 will be filled with vehicles 18 while others will be empty. At any given instant of time, the increments 14 of way 10 occupied by slots 16 will have the same ordinality. With passage of time, each slot progresses forward from increment to increment under the control of the system processor 74, and the vehicles 18 progress in synchronism with the slots. As slots 16 are transferred from one sector to the next, central controller 74 supplies information to register 72 of sector processor 60 as to whether the newly transferred slot is filled with a vehicle or not. Using this information, sector processor 60 updates its register 72 to reflect the programmed occupancy of the segments it is supervising. In normal operation, the vehicles move with definite spacing in synchronized fashion across the sector while the sector processor maintains a map in register 72 of the occupied sectors. As each vehicle moves along the way, a signal from its onboard transmitter 80 is radiated by its transmitting antennas 82 and sensed by the sensor antennas 86. The sector processor 60 periodically transmits an ordinality signal corresponding to the increment in which the slot should be located to each of the selectors 26 to select the antenna of the particular increment which is then programmed for occupancy by a slot. The selector responds to the ordinality signal by closing switch 92 to connect the corresponding antennas 86 to its segment receiver 32. The segment receiver 32 discriminates the signal applied to its input and supplies a quantized output signal to its storage register 40. A gating signal from sector processor 60 over line 66 reads the quantized signal into the storage register 40. Each storage register then indicates by its state whether the increment in its segment then programmed for occupancy by a slot 16 is occupied by a vehicle 18. The sector processor 60 next generates a series of shift signals on line 68 which are applied to the shift inputs 50 of the storage registers 40 causes shifting of the stored information (leftwards as illustrated) progressively into register 70 of the sector processor and when that information has been loaded into register 70 it is compared with the programmed occupancy of the segments as indicated by the contents of register 72. If the system is operating normally, the compare logic 76 will ascertain that there is correspondence between the programmed occupancy of the segments and the vehicles. The monitoring cycle may be repeated with selection of the next increment by augmentation of the ordinality signal.

Should, through some malfunction, a vehicle either accelerate or decelerate and occupy a position other than its assigned slot, this deviated vehicle would no longer be in position to stimulate the selected roadside antenna 86 designated by the ordinality input, and upon application of the gating signal, a null datum would be introduced into the corresponding storage register which in due course would be shifted to register 70 of the sector processor 60. Upon comparing the received data with the programmed occupancy data, compare logic 76 would discern the discrepancy and cause the control logic to provide an output signal. The sector processor of the system control would respond to this condition to initiate appropriate remedial action.

The described embodiment has particular advantages from standpoints of signal processing equipment requirements. Only one threshold processor is required for each segment, the sensors being switched or selected by the ordinality signal applied to the selector. Sequential transmission of data from one segment processor to another for transmission to the sector processing provides economical use of transmission equipment. The monitoring system has fail safe characteristics in that malfunction of a system component will result in the appearance of a null datum at the sector processor when an occupancy datum should appear or vice versa, so that a shut down condition may be implemented.

While a particular embodiment of the invention has been shown and described, various modifications thereof will be apparent to those skilled in the art. Different vehicle sensors might, for example, be used, multiple sensing for the presence of a vehicle on an assigned segment might be provided, or other vehicle characteristics might be monitored. Therefore it is not intended that the invention be limited to the disclosed embodiment or to details thereof and departures may be made therefrom within the spirit and scope of the invention as defined in the claims.

What is claimed is:

1. In a transportation system in which vehicles normally occupy only definite spaced virtual slots moving in synchronized fashion along a way, a method for monitoring the position of vehicles moving along a sector of way comprising the steps of
    dividing said sector of way into segments,
    dividing each of said segments into a plurality of increments of way, the number of increments in every segment being the same,
    periodically synchronously sensing all and only increments in said sector then occupied by slots to obtain data indicative of vehicle occupancy in said sensed increment in each segment,
    maintaining a current record of said segments programmed for occupancy by vehicles,
    comparing said obtained vehicle occupancy data with said current record, and
    providing an indication of discrepancies between actual and programmed occupancy.

2. The method as claimed in claim 1 including the steps of
    storing said obtained data as obtained, in a plurality of registers associated respectively with each segment, and
    sequentially shifting said stored data from one said register to another and finally to a processing station wherein said record is maintained.

3. The method as claimed in claim 1 including the steps of
    emitting a signal from all vehicles traversing said segment,
    sensing said signal to obtain said data.

4. In a transportation system in which vehicles normally occupy only definite spaced virtual slots moving in synchronized fashion along a way, apparatus for monitoring the position of vehicles passing on a sector of said way comprising
    a sector processing unit for storing information about the occupancy programmed for said sector and for comparing such information with information on the actual occupancy of said sector, said sector processor having an input for receiving data about the occupancy of said sector and
    a plurality of local processing units connected to the input of said sector processor, said local units being associated one-to-one with successive, contiguous segments dividing said sector, said segments being each as long as the spacing between successive slots, each of said local units including
    a plurality of sensors responsive to occupancy by a vehicle of a distinct increment of way along the associated segment, said sensors being ordered to correspond with the progress of a vehicle along said associated segment,
    a plurality of sensor selector switches associated one-to-one with said sensors, each switch having a data input connected with the associated sensor, an ordinality input, and an output, each of said switches being responsive to an ordinality signal applied to its said ordinality input to selectively connect to said switch output a sensor of ordinality designated by said ordinality signal,
    a receiver having an input connected to a plurality of said switch outputs and an output, said receiver operative to discriminate a signal on its said input and produce on its said output a quantized signal indicative of activation of said connected sensor.

5. The apparatus of claim 4 wherein each of said local processing units includes a storage register having a data input connected to said output of the receiver of the local unit, an output and a gating input, and is responsive to a signal applied to said gating input to admit and store a signal applied to its data input, all of said storage registers associated with said sector being serially interconnected as elements of a shift register having an output connected to said sector unit input.

6. Apparatus as claimed in claim 4, including on-board transmitters affixed to said vehicles and wherein said sensors include loop antennas installed along said way.

7. Apparatus for monitoring vehicles on a transit way comprising a series of sensors disposed along said way, each said sensor being adapted to produce a data output in response to occupancy by a vehicle of a distinct increment of said way associated with a corresponding sensor,
    a plurality of sensor selectors associated one-to-one with said series of sensors, each of said selectors having an indexing input operative to enable its associated sensor to produce a data output when and only when a signal of predetermined value indexing the associated sensor is applied to said indexing input and a vehicle is occupying the associated increment of way, the indexing signal being a function of desired vehicle performance
    a receiver coupled to a series of sensors, said receiver adapted to produce a qualified output signal indicative of stimulation of the then indexed sensor in response to a sensor data output and
    means for applying an indexing signal to said indexing inputs of said selectors.

8. Apparatus as claimed in claim 7 including a plurality of beacon transmitters, one on each of said vehicles, said sensors including wayside antennas for stimulation by said beacon transmitters.

9. Apparatus as claimed in claim 8 wherein said antennas are mounted on a curb of said way.

10. The apparatus as claimed in claim 7 wherein each said selector includes a switch connected between its associated sensor and said receiver, and said receiver includes a threshold detector and a storage circuit for storing said output signal.

11. The apparatus as claimed in claim 10 wherein said output signal is bipolar and indicates the presence or absence of a vehicle as detected by the indexed sensor, and said storage circuit is a bistable storage device.

12. The apparatus as claimed in claim 7 wherein said sensors are arranged in a plurality of sector groups, and further including a plurality of receivers and a sector processor associated with each said sector group, each said sector processor including timing and control means for generating selector indexing signals and sensing signals for sensing the output signals produced by said associated receivers.

13. The apparatus as claimed in claim 12 wherein said sector processor includes storage means and means responsive to said sensing signal for serially transferring said receiver output signals to said storage means.

14. The apparatus as claimed in claim 13 and further including a system controller including means for generating programmed vehicle data and wherein said sector controller includes means for comparing said programmed vehicle data with receiver output signals stored in said storage means.

15. The apparatus as claimed in claim 14 wherein each said vehicle includes a transmitter for transmitting an RF signal and each said sensor includes an elongated wayside antenna, each said antenna defining an increment of said way.

16. The apparatus as claimed in claim 15 wherein each said receiver includes a threshold detector responsive to the selected sensor antenna and a bistate storage circuit, and said sector processor timing and control means includes means for generating a series of shift signals to serially transmit data stored in said storage circuits to said storage means for comparison with said programmed vehicle data, and said comparing means including means for generating a discrepancy signal.

* * * * *